United States Patent [19]

Stretch

[11] Patent Number: 5,219,431
[45] Date of Patent: Jun. 15, 1993

[54] METHOD OF FORMING AND STRESSING COMPOSITE SPRINGS

[75] Inventor: Dale A. Stretch, Novi, Mich.

[73] Assignee: Eaton Corporation, Cleveland, Ohio

[21] Appl. No.: 814,312

[22] Filed: Dec. 23, 1991

Related U.S. Application Data

[63] Continuation-in-part of Ser. No. 560,407, Jul. 30, 1990, abandoned.

[51] Int. Cl.[5] .................................................. F16F 1/34
[52] U.S. Cl. .................................... 267/261; 192/106.1
[58] Field of Search ............... 267/148, 149, 158, 161, 267/162, 163, 164; 192/106.1, 106.2; 264/257, 157; 464/24, 68, 66, 67

[56] References Cited

U.S. PATENT DOCUMENTS

| | | |
|---|---|---|
| 620,916 | 3/1899 | Hafner . |
| 1,085,731 | 2/1914 | Hafner . |
| 1,751,228 | 3/1930 | Bethel . |
| 1,900,298 | 3/1933 | Morris ............................ 264/257 X |
| 2,812,936 | 11/1957 | Setz ...................................... 267/149 |
| 3,200,920 | 8/1965 | Reich ............................. 267/161 X |
| 3,236,066 | 2/1966 | Webb ....................................... 64/27 |
| 3,362,512 | 1/1968 | Ericson ................................. 192/68 |
| 3,984,998 | 10/1976 | Rogakos et al. ........................ 64/27 |
| 4,043,437 | 8/1977 | Taylor ........................... 192/106.1 X |
| 4,422,627 | 12/1983 | Schmidt et al. ..................... 267/148 |
| 4,499,037 | 2/1985 | Parker, Jr. ...................... 264/157 X |
| 4,690,256 | 9/1987 | Bopp et al. ............................ 192/21 |
| 4,782,932 | 11/1988 | Janson ......................... 192/106.1 X |
| 4,838,107 | 6/1989 | Herrmann .................... 192/106.1 X |
| 4,874,074 | 10/1989 | Damon et al. ................... 192/106.2 |
| 4,914,799 | 4/1990 | Kyle ...................................... 29/429 |

FOREIGN PATENT DOCUMENTS

| | | |
|---|---|---|
| 3527931 | 2/1987 | Fed. Rep. of Germany ...... 267/148 |
| 2611013 | 8/1988 | France . |

Primary Examiner—Robert J. Oberleitner
Assistant Examiner—Peter M. Poon
Attorney, Agent, or Firm—P. S. Rulon

[57] ABSTRACT

A torsional vibration damping mechanism (30) is disclosed in a free standing clutch plate (26) for a vehicle driveline. The mechanism (30) includes composite C-shaped springs (41,42) for attenuating driveline torsionals and transmitting driveline torque, and a viscous damper (48) for controlling the rate of flexing of the springs. The mechanism also includes input and output drives (46,44) for flexing the springs only radially inward. The C-shaped composite springs are formed by removing a minor arc of a closed ring comprising a plurality of layers of reinforcing filaments, or by cutting a composite cylinder into closed rings and removing the minor arc.

4 Claims, 3 Drawing Sheets

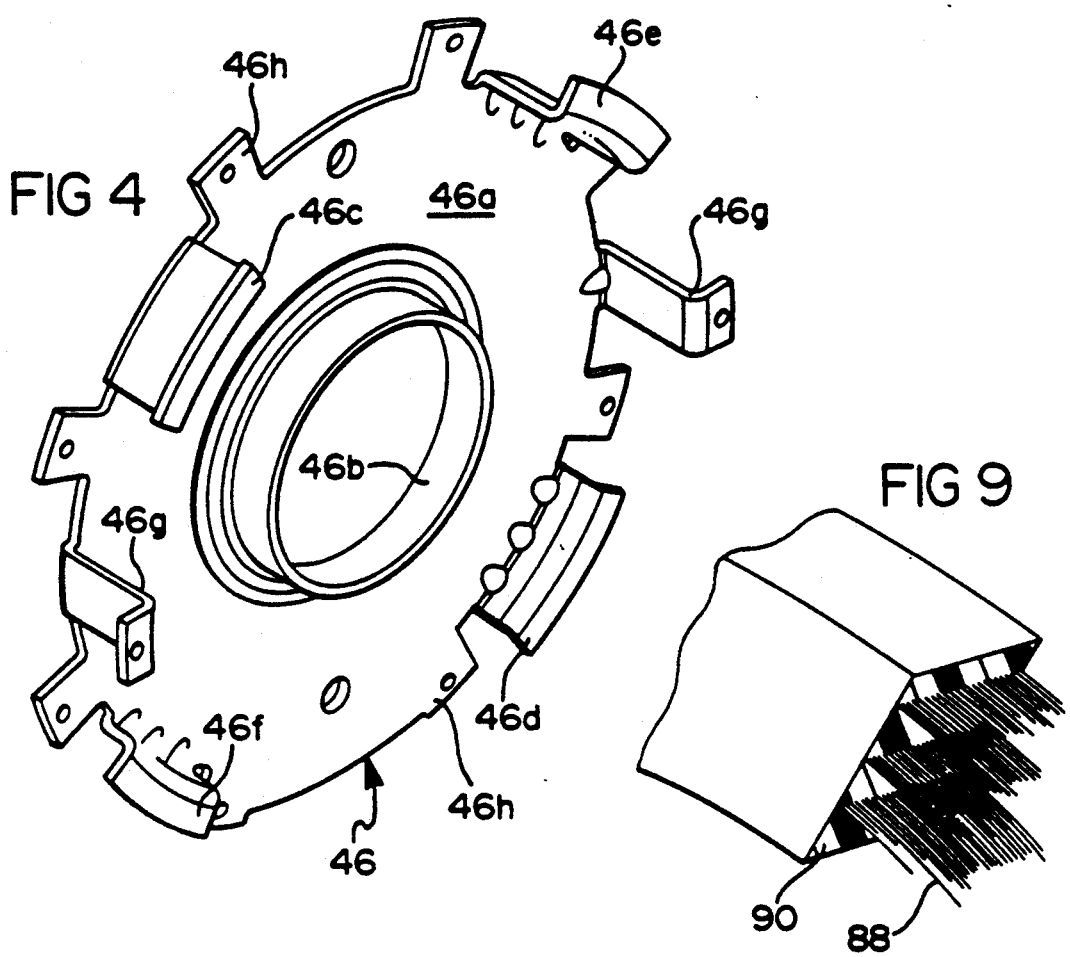
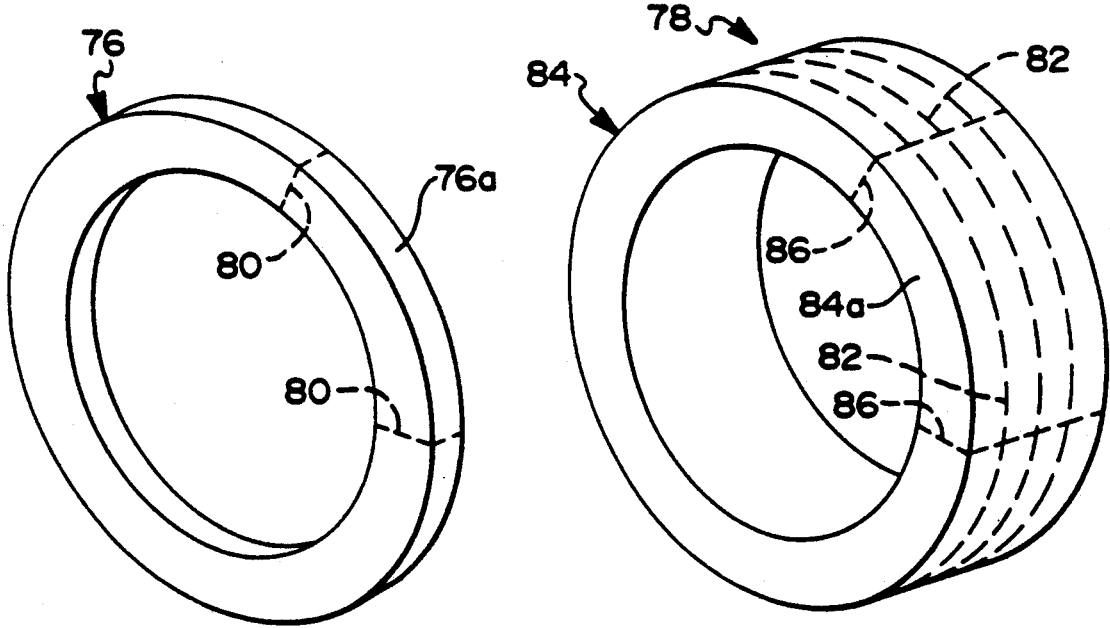

sponse to selective axial movement of a pressure plate 32 toward a flywheel 34 secured to an engine output shaft in known manner by partially shown bolts 36. The pressure plate is resiliently pushed into engagement by a diaphragm spring 38 when a schematically illustrated throw-out bearing 40 is in the solid line position and is disengaged when the throw-out bearing is in the phantom line position.

The torsional vibration damping mechanism 30 includes a pair of C-shaped springs 41,42 for attenuating torsionals and transmitting driveline torque, a hub assembly 44, a support member 46, and a viscous damper assembly 48. Damper assemblies other than the viscous shear type disclosed herein may be employed, e.g., the vane damper of previously mentioned U.S. Pat. No. 4,690,256 may be employed.

The hub assembly 44, is similar to the hub assembly in previously mentioned U.S. Pat. No. 4,874,074. The assembly includes outer and inner hub members 50,52 and, as seen in FIG. 6, two idle rattle springs 54. The hub members and springs collectively define a hub idle rattle assembly. Outer member 50 has a somewhat Z-shaped cross-section with an inner cylindrical surface journaled on an outer cylindrical surface of inner hub member 52 via a cylindrical portion of a bearing 56. Relative axial movement of the hub members is prevented by a thrust washer 57 sandwiched between a radially extending portion of bearing 56 and a snap ring secured in a groove of hub member 50. Inner hub member 52 is slidably splined to shaft 22. The idle rattle portion of the assembly has a plurality of internal spline teeth 50a and two diametrically oppositely disposed recesses 50b defined by hub 50, an equal number of external spline teeth 52a loosely received in teeth 50a and two diametrically oppositely disposed recesses 52b registering with recesses 50b, and the springs 54 for opposing the free play between teeth 50a,52a. Springs 54 are designed to provide a force sufficient to resiliently interconnect the hub members when the transmission is in a neutral position, i.e., when shaft 22 is not connected to a load. Hence, springs 54 are of a relatively low rate or stiffness compared to springs 41,42 which are designed to resiliently transmit substantially maximum normal driveline torque. Hub assembly 44 further includes a plate member 71 affixed to and extending radially outward from outer hub member 50. The plate includes first and second pairs of output drive lugs 71a,71b and 71c,71d which react with springs 41,42.

Support member 46, as best seen in FIG. 4, includes a radially extending flange portion 46a having an inner sleeve portion 46b journaled via a sleeve bearing 58 on an outer cylindrical surface of outer hub member 50, first and second pairs of input drive lugs 46c,46d and 46e,46f for reacting with springs 41,42 and defined on the free ends of portions extending axially in cantilever fashion from flange portion 46a, a pair of axially extending brackets 46g for securing a flat ring 60 thereto via fastener 61 shown in cross-section in FIG. 3, and six radially extending tabs 46h for securing an inner periphery of a flange 28c of the friction ring and an outer periphery of an annular housing assembly 62 of the viscous damper by fasteners 64. Flat ring 60 prevents rightward axial movement of the adjacent C-shaped spring 42. Ring 60 and washer 57 are removed in FIG. 3 to show details of the underlying structure.

Viscous damper assembly 48 includes the annular housing assembly 62 and an annular clutch assembly or viscous shear plate assemblies 66. The damper assembly is preferably of the type disclosed in U.S. Pat. No. 4,914,799 which is incorporated herein by reference. Briefly, the damper housing assembly includes axially spaced apart sidewalls 68,70 defining a chamber filled with a viscous liquid. The clutch or shear plate assembly 66 includes a radially inner portion 66a splined to inner hub member 50 and a radially outer portion having oppositely facing clutching surfaces in close axially spaced relation with surfaces defined by sidewalls 68,70. The housing and clutch surfaces are disposed for clutching coaction therebetween via the viscous shear liquid in response to relative rotation of the housing and clutch assembly. Such relative rotation, of course, occurs in response to flexing of springs 41,42,54 and therefore relative rotation of the damping mechanism input and output defined by support member 46 and hub assembly 44.

C-shaped springs 41,42 each include a first end 41a,42a and a second end 41b,42b. In FIG. 3, spring 42 is partially broken away on either side of the six o'clock position to show the first and second ends 41a,41b of spring 41. Each spring end has affixed thereto an end bracket 72. The bracket may be secured in any of several known manners, e.g., an elongated fastener 74 such as illustrated by phantom lines in FIG. 3. The brackets with respect to their installed positions each include a radially outwardly extending contact 72a and a radially inwardly extending contact 72b. The radially outer contacts 72a of the brackets affixed to the first and second ends of spring 42 are embraced by circumferentially spaced apart lugs 46c,46e of the first and second pairs of input drive lugs, and in the same manner the contacts 72a of the brackets affixed to the first and second ends of spring 41 are embraced by circumferentially spaced apart lugs 46d,46f of the first and second pairs of input drive lugs. Each bracket also includes a radially extending stop surface 72c. When the brackets are installed, the stop surface limit the number of rotational degrees each spring can flex, therein the stop surfaces are forty degrees apart.

The radially inner contacts 72b of the brackets affixed to the first and second ends of spring 42 are embraced by circumferentially spaced apart lugs 71a,71c of the first and second pairs of output drive lugs, and in the same manner the radially inner contacts 72b of the brackets affixed to the first and second ends of spring 41 are embraced by circumferentially spaced apart lugs 71b,71d of the first and second pairs of output drive lugs. Lugs 71a,71c and 71b,71d are axially offset so as to be aligned with the axial center of springs they are in driving relation with.

C-shaped springs 41,42 are preferably formed from individual rings 76, as is illustrated in FIG. 7 or, alternatively, from a cylinder 78 as is illustrated in FIG. 8. Ring 76 is formed to the desired axial and radial thickness, and then made into a C-shape by cutting along phantom lines 80 to remove a minor arc portion 76a. Cylinder 78 is formed to the desired radial thickness, then cut along phantom lines 82 into rings 84 of desired axial thickness and then made into a C-shape by cutting along phantom lines 86 to remove a minor arc portion 84a.

FIG. 9 schematically illustrates an enlarged portion of one of the C-shaped composite springs with layers of reinforcing filaments 88 protruding from a matrix of plastic material 90. The filaments extend in the direction of curvature of the rings or cylinders. The filaments and

METHOD OF FORMING AND STRESSING COMPOSITE SPRINGS

This is a continuation-in-part of copending application Ser. No. 07/560,407 filed on Jul. 30, 1990 now abandoned.

CROSS REFERENCE

This application relates to U.S. patent application Ser. Nos. 07/560,408 and 07/568,540, filed Jul. 30, 1990 and assigned to the assignee of this application.

FIELD OF THE INVENTION

This invention relates to a composite spring for a torsional vibration damper mechanism. More specifically, the invention relates to such composite springs that are stressed in one direction.

BACKGROUND OF THE INVENTION

Torsional vibration damping mechanisms have long been used to reduce the adverse effects of torsional vibrations or fluctuating torques in vehicle drivelines. Such torsional vibrations or fluctuating torques, hereinafter referred to as torsionals, emanate primarily from engine power pulses and torque spikes, and from abrupt changes in driveline torque due primarily to rapid engine acceleration/deceleration and transmission ratio changes.

Such mechanisms commonly employ a spring(s) to attenuate torsionals and transmit positive and negative torque between the vehicle engine and wheels, and employ a damper assembly to control the rate of flexing of the springs. Examples of such mechanisms may be seen by reference to U.S. Pat. Nos. 4,874,074 and 4,690,256; and French patent application 2,611,013. These documents are incorporated herein by reference.

The mechanisms in the U.S. documents each employ a nested pair of spiral wound springs formed of steel; these springs are designed to withstand flexing of forty or more degrees, flex radially inward and outward in response to increasing positive and negative torque, and are symmetrically balanced when paired.

The mechanism in the French Patent document employs a single spiral wound spring formed of a composite material including a plurality of layers of reinforcing filaments bonded together by a plastic material; this spring has an unknown flex design limit, flexes radially inward and outward in response to increasing positive and negative torque, and is not per se symmetrically balanced.

The steel spiral wound springs in the mechanism of the U.S. patent documents have the disadvantage of increasing the inertia of the damping mechanism. The composite spring in the mechanism of the French patent document has the disadvantage of being per se symmetrically unbalanced, is difficult to install in a damper mechanism for flexing in only one direction, and is prone to delamination failure of the reinforcing filaments due to flexing in both directions.

SUMMARY OF THE INVENTION

An object of the present invention is to provide an improved composite spring.

Another object of the present invention is to stress the spring in one direction to improve the spring life.

According to a feature of the invention, the life cycle of a torque transmitting spring is improved. The spring is formed of a plurality of layers of reinforcing filaments bonded together by a plastic material. The spring has a predetermined radius of curvature in the relaxed state, and has first and second ends for transmitting torque to and from rotatable members.

The improvement is characterized by applying reacting torque at both of the spring ends in directions only decreasing the radius of curvature.

According to a further feature of the invention, the spring is formed from a closed ring having a minor arc portion removed therefrom.

BRIEF DESCRIPTION OF THE DRAWINGS

The torsional vibration damping mechanism of the present invention is shown in the accompanying drawings in which:

FIG. 3 is a detailed relief view of a portion of the mechanism looking in the direction of arrow 3 of FIG. 2;

FIGS. 4 and 5 are perspective views of parts in the mechanism;

FIGS. 7 and 8 are respectively perspective views of a ring and a cylinder of composite material prior to being made into C-shaped springs; and FIG. 9 is an enlarged schematic view of a portion of one of the C-shaped springs illustrating layers of reinforcing filaments protruding from a matrix of plastic material.

DETAILED DESCRIPTION OF THE DRAWINGS

Figure 1:
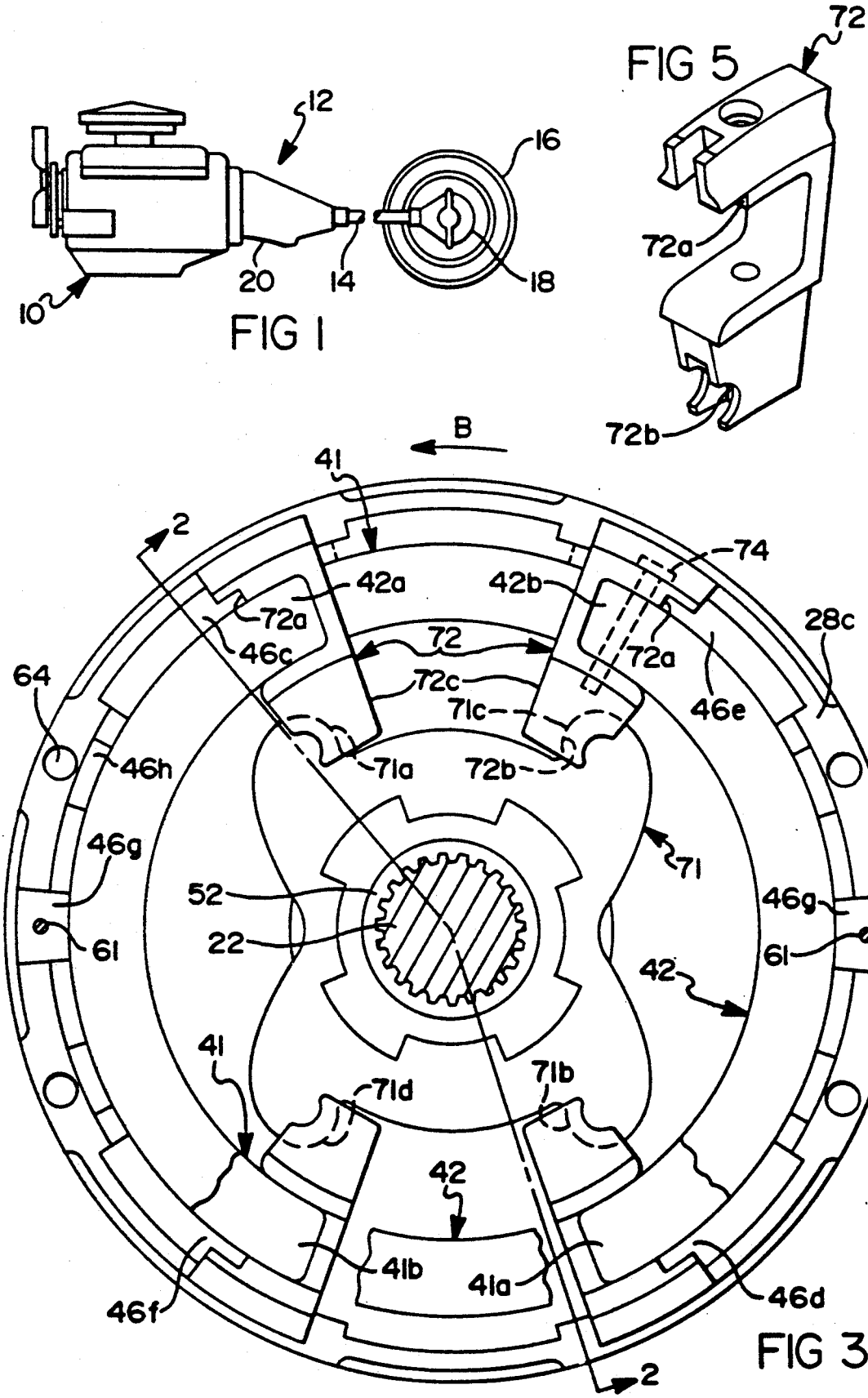
FIG. 1 is a schematic view of a motor vehicle driveline.

The motor vehicle driveline seen schematically in FIG. 1 includes a prime mover 10 and a transmission 12 having an output shaft 14 drivingly connected to a load such as ground engaging wheels 16 via a differential gear assembly 18 for rear and/or front axles of a vehicle. Prime mover 10 is preferably of the internal, periodic combustion type but may be any type of power plant having torque characteristics that are improved by a torsional vibrational damping mechanism. The transmission includes a housing 20 containing a plurality of unshown, constant mesh ratio gears or ratio change mechanism driven by a transmission input shaft or drive 22 partially shown in FIG. 2. Well-known ratio change devices or clutches within the transmission are employed to selectively (i.e., manually or automatically) put the transmission into a neutral position wherein the input shaft is not connected to the load or into in-gear positions wherein the input shaft is connected to a load such as wheels 16.

Figure 2:
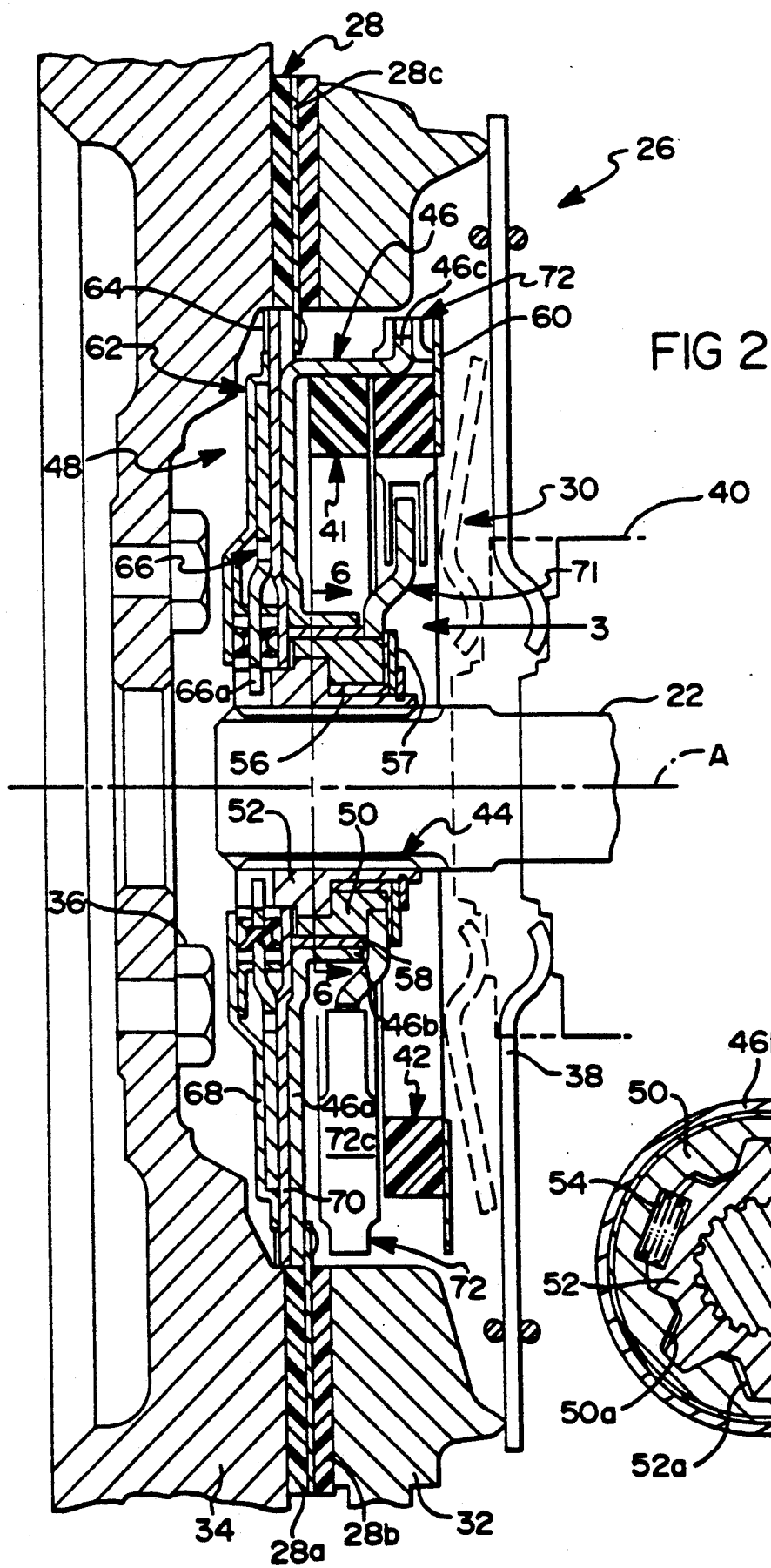
FIG. 2 is a detailed, sectional view of the torsional vibration damping mechanism looking along line 2—2 of FIG. 3.
Figure 6:
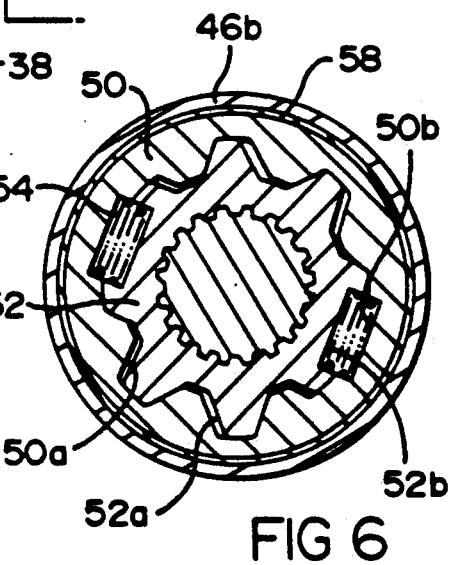
FIG. 6 is a sectional view of a hub assembly looking along line 6—6 of FIG. 2.

Looking now at FIGS. 2-6 and primarily at FIGS. 2 and 3, therein is illustrated a master clutch plate assembly 26 disposed for rotation about the axis A of shaft 22 and in one direction indicated by arrow B in FIG. 3 and taken as the direction of positive torque. The clutch plate assembly includes an annular friction ring 28 in driving relation with shaft 22 via a torsional vibration damping mechanism 30 positioned radially between the friction ring and shaft 22. The friction ring includes oppositely facing friction surfaces 28a,28b frictionally connected to an unshown engine output shaft in relayers of filaments are substantially closer together than illustrated and comprise more than 50% of the volume of the composite material. The filaments and the plastic may be any of several known materials. For example, the filaments may be formed of carbon glass, aramids, boron, nylon, etc. The plastic may be formed of epoxides, cyante esters, bismaleimides, thermoset polyimides, thermoplastic polyimides, etc. Good results have been obtained with glass fibers bonded together by an epoxy resin marketed by Shell Oil Company as Shell 9405.

Rings 76 and/or cylinders 78 may be formed by layup of layers of strands of the filaments or fibers coated with the liquid plastic like material. However, the rings and/or cylinders are preferably formed by winding continuous strands or layers of filaments or fibers, such as glass fibers, in annular groves on a rotating mandrel mechanism, not shown. The reinforcing strands of filament extend substantially parallel to each other about the radius of curvature of the rings or cylinders. The strands and layers of strands are, of course, bonded together by the plastic material. With such a curved composite spring structure, flexing of the spring structure in directions increasing the radius of curvature imposes tensile stresses between the layers of reinforcing stands and flexing in directions decreasing the radius of curvature imposes compressive stress between the layers of strands.

The tensile stresses tend to separate or dilaminate the layers and the compressive stresses tend to compress or cause the layers to compressively close on each other. In identical tests of identical curved composite springs of the type disclosed herein, such springs subjected to cyclic torques only decreasing their radius of curvature had average life cycles greater than eight to ten times the life cycle of such springs subjected to torques increasing their radius of curvature.

A preferred embodiment of the invention has been disposed for illustrative purposes. Many variations and modifications of the preferred embodiment are believed to be within the spirit of the invention. The following claims are intended to cover the inventive portion of the preferred embodiment and variations and modifications within the spirit of the invention.

What is claimed is:

1. A method of improving the life cycle of a torque transmitting spring formed of a plurality of layers of reinforcing filaments bonded together by a plastic material, the spring having a predetermined radius of curvature in the relaxed state and having first and second ends for transmitting torque to and from rotatable members, layers of the reinforcing filaments extending parallel to the radius of curvature; characterized by:
    applying reacting torque at both of the spring ends in directions only decreasing the radius of curvature for causing the layers of filaments to compressively close on each other.

2. The method of claim 1, including the step of:
    forming the spring in a C-shape.

3. The method of claim 1, including the step of:
    forming the spring as a closed annular ring; and
    removing a minor arc portion of the ring to define the first and second ends.

4. The method of claim 1, including the step of:
    forming an elongated cylindrical member of the filaments and plastic material; slicing the cylindrical member into a plurality of rings of a substantially desired axial thickness; and
    removing a minor arc portion of each ring to define the first and second ends.

* * * * *